Patented Sept. 24, 1935

2,015,078

UNITED STATES PATENT OFFICE 2,015,078

COATING COMPOSITION

Walter E. Lawson, Wilmington, Del., assignor to E. I. du Pont de Nemours & Company, Wilmington, Del., a corporation of Delaware No Drawing. Application October 14, 1932, Serial No. 637,782

17 Claims. (Cl. 134—79)

This invention relates to new compositions of matter, and it more particularly pertains to coating compositions and plastic compositions, an ingredient of which is a carboxylic acid ester of a branched carbon open-chain alcohol having at least six carbon atoms.

An object of this invention relates to the preparation of coating and plastic compositions containing as an ingredient a carboxylic acid ester of an alcohol having at least six carbon atoms and having a branched carbon open-chain. A further object of the invention relates to the use of polybasic acid esters of the said alcohols in coating and plastic compositions. A still further object relates to the use of monobasic acid esters of the above described alcohols in coating and plastic compositions. Other objects of the invention will appear hereinafter.

The esters which are used in accordance with the teachings of the present invention may be prepared by reacting carboxylic acids, either polybasic or monobasic, or their anhydrides or chlorides, with branched carbon open-chain alcohols containing at least six carbon atoms, or by reacting sodium salts of the acids with chloride or other halide esters of the alcohols under suitable conditions or by ester interchange of these alcohols with esters of more volatile alcohols.

The following examples which are illustrative only typify the methods used in the preparation of these esters:

Example 1

A mixture of alcohols boiling above 160° C., all of which have a branched carbon chain structure and which were obtained in the catalytic synthesis of methanol from CO and $N_2$, which mixture contains various amounts of the following alcohols: 2,4,dimethyl-1-pentanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,trimethyl-1-decanol, 2,4,6,8,tetramethyl-1-decanol, 3-methyl-2-hexanol, 3-methyl-2-heptanol, 5-methyl-3-octanol, 3-ethyl-2-monanol, etc. may be used in the preparation of a neutral phthalate as follows: A mixture containing 400 grams phthalic anyhdride, 780 grams of the above alcohols, 200 grams toluol, and 10 grams sulfuric acid, is heated in an apparatus designed to separate water from the distillate and to return the toluol to the reaction flask. Distillation is continued until the theoretical amount of water has been removed. The product is washed with sodium carbonate solution to remove the acid and is then refined by heating under vacuum in the presence of decolorizing carbon until the temperature reaches approximately 180° C. at 50 mm. The product is filtered to remove the carbon and is then ready for use. The product as above prepared comprises a mixture of phthalic esters in which at least on carboxyl group has been esterified by the branched carbon-chain alcohols in the mixture. Such an ester mixture is useful as a plasticizer for cellulose nitrate and cellulose ether compositions.

Example 2

A benzene solution of mixed alcohols (obtained from the methanol synthesis) boiling above 135° (the composition of which is essentially the same as the mixture used in Example 1 and containing in addition 2-methyl-1-pentanol) is mixed with an equimolar proportion of phthalic anhydride and heated overnight in a steam bath. The solution is then cooled to 5 to 10° to precipitate unchanged phthalic anhydride which is filtered off. The benzene solution is then extracted with 10% sodium hydroxide solution in an amount equivalent to the phthalic anhydride which is reacted. After the alkali and benzene have been thoroughly mixed they are allowed to separate. The lower or aqueous layer contains the sodium salts of the acid phthalate ester of the primary alcohols contained in the original mixture, while the upper layer contains the secondary alcohols dissolved in benzene. The acid ester may be obtained by the addition of mineral acid to the aqueous solution.

Example 3

A mixture containing the above acid phthalate ester prepared as described in Example 2 and butyl alcohol in equal molar proportions is dissolved in toluol with the addition of a small amount of sulfuric acid as a catalyst and heated in an apparatus described in Example 1. After removal of the theoretical amount of water, the product is refined as in Example 1. The resultant product is a mixed butyl higher alcohol ester of phthalic acid.

*Example 4*

A mixture containing 150 grams phthalic anhydride, 300 grams of 2-methyl-pentanol-1, 200 grams ethylene dichloride, 5 grams sulfuric acid (specific gravity 1.84) is heated to boiling in an apparatus as described in Example 1. The product is refined as in Example 1. The neutral ester thus obtained is very useful as a plasticizer for cellulose derivative compositions.

In place of the 2-methyl-pentanol-1 used in Example 4, one may substitute any of the branched carbon chain primary alcohols containing 6 to 14 carbon atoms, including 2,4-dimethyl-1-pentanol, 4-methyl-1-hexanol, 2,4-dimethyl-1-hexanol, 5-methyl-1-heptanol, 4,6-dimethyl-1-heptanol, 2,6,dimethyl-1-octanol, 2,4,6,-trimethyl-1-octanol, 2-ethyl-4-6-dimethyl-1-octanol, 2,4,6,trimethyl-1-decanol, 2,4,6,8,tetramethyl-1-decanol, or one may use a mixture of primary alcohols within this range. The products obtained are equally valuable as plasticizers. In the preparation of compounds similar to that described in Example 3, one may use any alcohol in place of butanol for the second step of the esterification, e. g., cyclohexanol, benzyl alcohol, hexahydrobenzyl alcohol, ethyl alcohol, octyl alcohol, decyl alcohol, monoalkyl and aryl ethers of glycols and polyglycols, dialkyl or diaryl ethers of glycerol, tetrahydrofurfuryl alcohol, or one may use secondary alcohols including those commonly found in higher alcohols from the methanol synthesis such as 2-methyl-3-pentanol, 3-methyl-2-pentanol, 2,4,dimethyl-3-pentanol, 3,4,-dimethyl-2-pentanol, 3-methyl-2-hexanol, 3-methyl-2-heptanol, 5-methyl-3-octanol, 3-ethyl-2-nonanol, etc. Any one of these secondary branched carbon chain alcohols may be substituted for the primary alcohols in the processes described in Examples 3 and 4.

In preparing the mixture of alcohols, the use of which is described in Example 1, by way of catalytic synthesis from carbon monoxide and hydrogen, this mixture of alcohols, due to the nature of the methanol synthesis reaction, contains in association therewith, numerous organic compounds other than alcohols, which for the most part contain oxygen in substantial amounts. This fact is readily recognized from the knowledge possessed by the art regarding the nature of the products produced during the methanol synthesis. The scope of the invention contemplates the use of these crude alcoholic mixtures in preparing esters of the character described.

The esters prepared as above described are all liquids varying from water-white to light amber in color, depending on their purity. They are high boiling and quite compatible with cellulose derivatives. In fact, they are more desirable for use with cellulose derivatives than similar esters prepared from straight chain normal alcohols of the same molecular weight. Although Examples 1 to 4 include only phthalic acid and phthalic anhydride, any polycarboxylic acid may be used including adipic, succinic, sebacic, citric, tartaric, trimesic, quinolinic, hexahydrophthalic, tetrahydrophthalic, etc.

Typical coating compositions containing these compounds as plasticizers are given in the following examples:

*Example 5*

| | Parts |
|---|---|
| Cellulose nitrate | 12 |
| Damar | 3 |
| bis-2-methyl-n-amyl phthalate | 4 |
| Castor oil | 2.6 |
| Solvent | 166 |

*Example 6*

| | Parts |
|---|---|
| Ethyl cellulose | 12 |
| 2-methyl-n-amyl-butyl phthalate | 4 |
| Solvent | 180 |

*Example 7*

| | Parts |
|---|---|
| Cellulose nitrate | 12 |
| Pigment | 16 |
| Resin | 3.5 |
| Oil | 3.5 |
| bis-2,4-dimethyl-n-amyl adipate | 4 |
| Solvent | 181 |

*Example 8*

| | Parts |
|---|---|
| Cellulose nitrate | 10 |
| Resin | 6 |
| 2,4-dimethyl-n-hexyl, 5 - methyl - n - heptyl phthalate | 6 |
| Wax | 2 |
| Solvent | 170 |

*Example 9*

| | Parts |
|---|---|
| Cellulose nitrate | 10 |
| bis-5-methyl-n-heptyl sebacate | 12 |
| Pigment | 10 |
| Solvent | 20 |

The compositions described in Examples 5, 6, and 7 are the type used as coating compositions for metal, wood, etc. The composition described in Example 8 is of the type used in coating regenerated cellulose to improve its moistureproofness. The composition described in Example 9 is of the type used in coating fabrics for the manufacture of artificial leather, etc. In all of the above examples the term "solvent" is to be understood as designating suitable esters, alcohols and hydrocarbons or mixtures thereof which are solvents for the cellulosic composition, and the usefulness of which for that purpose would be obvious to one skilled in the art. Resins other than those mentioned including other natural resins than damar, as well as synthetic resins such as phenol-formaldehyde, polyhydric alcohol-polybasic acid condensation products, vinyl resins, etc., may be used.

Typical plastic compositions containing these new compounds are given in the following examples:

*Example 10*

| | Parts |
|---|---|
| Cellulose acetate | 100 |
| bis-4-methyl-n-hexyl tartrate | 40 |

*Example 11*

| | Parts |
|---|---|
| Cellulose nitrate | 100 |
| 2,4-dimethyl-n-hexyl cyclohexyl phthalate | 60 |
| Pigment | 200 |

*Example 12*

| | Parts |
|---|---|
| Ethyl cellulose | 100 |
| 2,4 - dimethyl - n - amyl benzyl hexahydrophthalate | 15 |

The above plastic compositions may be prepared with or without the usual volatile solvents, that is, alcohol with cellulose nitrate compositions, acetone with cellulose acetate compositions, and toluol alcohol mixture with ether compositions. It is to be understood that in the above plastic compositions, as well as the above coating compositions, that other cellulose derivatives may be used including cellulose propionate, cellulose butyrate, cellulose acetobutyrate, benzyl cellulose, etc. It is also to be understood that a portion of the plasticizer in any of the above examples may be replaced by other plasticizers of the group covered by this invention or by one or more of the more common plasticizers such as triacetin, camphor, dibutyl phthalate, tricresyl phosphate, methoxy-ethyl phthalate, ethyl-para-toluene sulfonamide, etc.

The compounds herein disclosed may likewise be used as plasticizers and/or softeners for natural resins such as damar, sandarac, Congo, elemi, guaiac, kauri, rosin, etc., and synthetic resins such as polyhydric alcohol-polybasic acid resins (glyptals), phenol-aldehyde resins, urea-formaldehyde resins, vinyl resins, ester gums, ether resins, etc. They may be used alone or in conjunction with other modifiers for the resin, such as waxes, etc.

The method of preparation of the compounds described above is capable of considerable variation in the esterification reaction catalysts other than those mentioned may be used. Solvents other than those mentioned may be used to remove the water. In some cases solvents may be used without the use of a catalyst, and in still other cases neither solvent nor catalyst may be used. Also one may react a chloride or simple ester of the acid with the branched chain primary alcohols or the chloride of the alcohol with a salt of the acid under suitable conditions.

In addition to the neutral polybasic acid esters of the branched carbon open-chain alcohols referred to, the invention also contemplates the production of monobasic acid esters of these alcohols. One method of preparing this class of esters is disclosed in the following example:

*Example 13*

A mixture consisting of 43.4 parts coconut oil acids (which acids contain caproic, caprylic, capric, lauric, myristic, palmitic, and stearic acids) and 52 parts of the mixture of higher alcohols used in Example 1, 3.3 parts of toluene, and 0.1 part of sulfuric acid was heated in a distillation apparatus described in Example 1, and refined as in Example 1. The product consisted of a mixture of esters of the above acids and alcohols.

In the above example one may substitute any one of the pure primary or secondary branched carbon open-chain alcohols, contained in the mixture, for the mixture of alcohols or one may substitute any pure monocarboxylic acid for the coconut oil acid. Other acids which may be used include benzoylbenzoic acid, benzoic acid, hexahydrobenzoic acid, levulinic acid, furoic acid, and other aliphatic, aromatic, or heterocyclic acids.

The novel monobasic acid esters prepared as described in the above example are likewise useful as ingredients of cellulosic derivative compositions. Thus, in Examples 3 to 5, the polybasic acid neutral ester plasticizers may be replaced by the monobasic acid esters, e. g., 2,4-dimethyl-n-hexyl-stearate, and in Example 9, 2-methyl-n-hexyl-benzoyl benzoate may be substituted for the 2,4-dimethyl-n-hexyl-cyclohexyl phthalate named therein. The characteristics, the utility, and the modifications described for the polybasic acid esters apply in a similar manner to the novel monobasic acid esters.

The novel esters may be used in the preparation of all types of compositions containing cellulose esters and/or ethers. They may be used in the preparation of lacquers for coating metal and wood, dopes for coating fabrics, moistureproof lacquers for coating regenerated cellulose, and in plastic compositions to be used in the preparation of toiletware novelties, sheeting, rods, tubes, safety glass interlayer, etc.

The advantage of this invention is that it furnishes high boiling, water-resistant plasticizers for cellulose derivatives, and due to their low vapor pressure they give permanently flexible products having good durability. These compounds are characterized by being more satisfactory plasticizers for cellulose derivatives than compounds prepared from straight chain normal alcohols of the same molar weight. For example, the di-phthalate of 2,4-dimethyl hexanol-1 gives a good water-resistant coating when used as a plasticizer for cellulose nitrate, and the composition does not have a greasy feel, whereas di-n-octyl phthalate, although giving a good water-resistant composition when used as a plasticizer for cellulose nitrate, if used in sufficient quantity to flexibilize the film has a somewhat greasy feel. This is especially true of the esters of higher straight chain alcohols, such as lauryl esters.

The term "branched carbon open-chain alcohol" is intended to apply to open-chain alcohols, the carbinol group of which is attached to a branched carbon radical. The alcohols within this class with which the invention is most particularly concerned are those having from six to fourteen carbon atoms.

The above description and examples are to be taken as illustrative only and not as limiting the scope of the invention. Any modification or variation therefrom which conforms to the spirit of the invention is intended to be included within the scope of the claims.

I claim:

1. A composition containing a cellulose derivative, and a carboxylic acid ester of a branched carbon open chain primary alcohol having at least six carbon atoms, said alcohol being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

2. A composition containing a cellulose derivative, and a neutral carboxylic acid ester of a branched carbon open chain primary alcohol having at least six carbon atoms, said alcohol being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

3. A composition containing a cellulose derivative, and a polybasic carboxylic acid ester of a branched carbon open chain primary alcohol having at least six carbon atoms, said alcohol being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

4. A composition containing a cellulose derivative, and a monobasic carboxylic acid ester of a branched carbon open chain primary alcohol having at least six carbon atoms, said alcohol being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

5. A coating composition containing a cellulose derivative, a carboxylic acid ester of a branched carbon open chain primary alcohol having at least six carbon atoms and a solvent for the cellulosic material, said alcohol being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

6. A plastic composition containing a cellulose derivative, a carboxylic acid ester of a branched carbon open chain primary alcohol having at least six carbon atoms and a modifying agent, said alcohol being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

7. The composition described in claim 3 in which the carboxylic acid referred to is phthalic acid.

8. A coating composition for moistureproofing regenerated cellulose comprising a cellulose derivative, a wax and a neutral polybasic acid ester of a branched carbon open-chain alcohol having at least six carbon atoms, said alcohol being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6 dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

9. A composition containing a cellulose derivative, and carboxylic acid esters of mixed branched carbon open chain primary alcohols having at least six carbon atoms, at least one of said alcohols being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

10. The composition described in claim 9 characterized in that the mixed alcohols are prepared by the catalytic hydrogenation of carbon monoxide.

11. A composition containing a cellulose derivative, and neutral carboxylic acid esters of mixed branched carbon open chain primary alcohols having at leats six carbon atoms, at least one of said alcohols being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

12. The composition described in claim 11 characterized in that the mixed alcohols are prepared by the catalytic hydrogenation of carbon monoxide.

13. A composition containing a cellulose derivative and bis-2-methyl-n-amyl phthalate.

14. A composition containing a cellulose derivative and bis-2-4-dimethyl-n-amyl phthalate.

15. A composition containing a cellulose derivative and 2-4-dimethyl-n-hexyl stearate.

16. A composition containing a cellulose ether and a carboxylic acid ester of a branched carbon open-chain primary alcohol having at least six carbon atoms, said alcohol being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

17. A composition containing a cellulose ether and carboxylic acid esters of mixed branched carbon open-chain primary alcohols having at least six carbon atoms, at least one of said alcohols being taken from the class consisting of 2,4-dimethyl-1-pentanol, 4-methyl-1-hexanol, 2,4-dimethyl-1-hexanol, 5-methyl-1-heptanol, 4,6-dimethyl-1-heptanol, 2,6-dimethyl-1-octanol, 2,4,6-trimethyl-1-octanol, 2-ethyl-4-6-dimethyl-1-octanol, 2,4,6-trimethyl-1-decanol, 2,4,6,8-tetramethyl-1-decanol, and 2-methyl-1-pentanol.

WALTER E. LAWSON.